April 27, 1965  R. J. GRUENSTEIN  3,180,656
SCOOTER DRIVING ASSEMBLY
Filed June 18, 1963
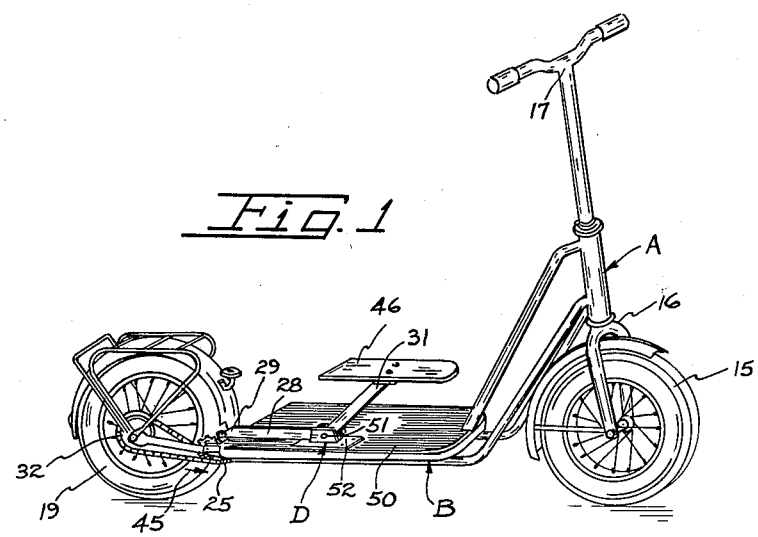
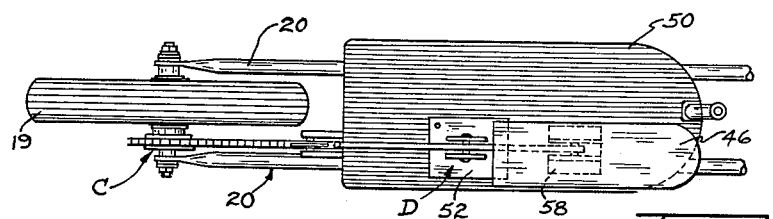
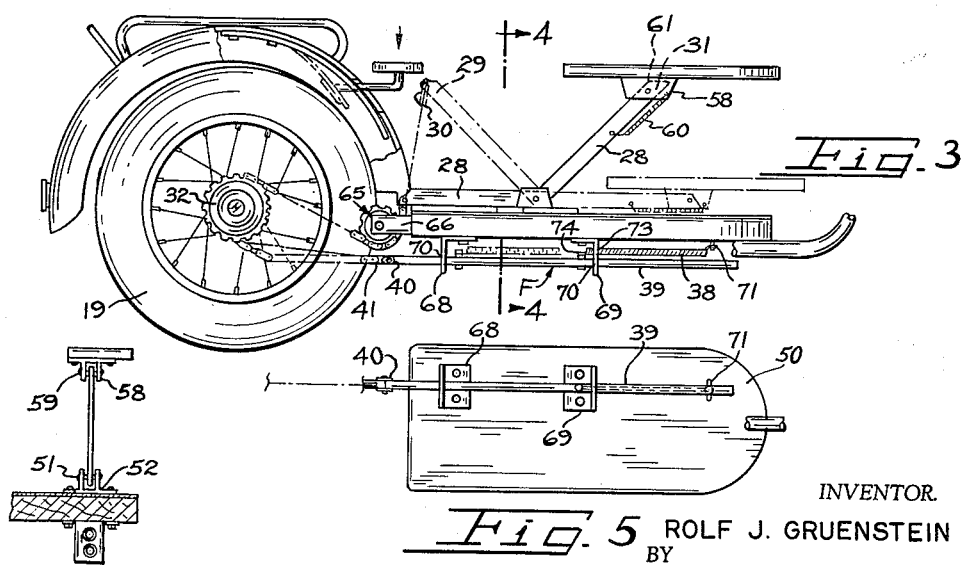
INVENTOR.
ROLF J. GRUENSTEIN
BY
Townsend and Townsend
ATTORNEYS

United States Patent Office 3,180,656
Patented Apr. 27, 1965

3,180,656
SCOOTER DRIVING ASSEMBLY
Rolf J. Gruenstein, 1639 Lewiston Drive,
Sunnyvale, Calif.
Filed June 18, 1963, Ser. No. 288,724
4 Claims. (Cl. 280—255)

This invention relates to improvements in treadle driven scooters. Such scooters are a type of wheeled vehicle having a rocker arm type drive which enables the scooter to be foot-driven by a reciprocating pedal mounted on the platform of the scooter. The principal object of this invention is to provide an improved drive of greater efficiency, effectiveness and reliability for such scooters.

Another object of this invention is to provide a chain-type drive for a scooter in which the pedal assembly for moving the chain can be operated by a relatively small stroke and still maintain a relatively large amount of chain movement for actuating the sprocket wheel drive of the scooter.

A feature and advantage of this invention is that the device can be operated more effectively and with greater speed due to the limited required lever arm stroke facilitated by the short stroke mechanical configuration.

Another object of this invention is to provide means for allowing the drive chain to be moved tangentially to a guide sprocket and thence around the drive sprocket of the scooter to achieve maximum chain movement with rocker arm displacement.

Still another object of this invention is the provision of a longitudinal guide to maintain the chain in coplanar as well as vertical alignment with the drive sprocket on the return chain end. A feature and advantage of this mechanism is that the alignment of the chain is maintained so that it will have less likelihood of jamming or falling off of the drive sprocket.

Another feature and advantage of the longitudinal guide is that the spring return for the chain is connected to a reciprocally mounted bar rather than to the chain directly, thus preventing spring "whip" from being transmitted to the chain.

Other objects of the present invention will become apparent upon reading the following specification and referring to the accompanying drawings in which similar characters of reference represent corresponding parts in each of the several views.

In describing the invention, reference will be made to the accompanying drawing in which:

FIG. 1 is an overall perspective view showing a scooter embodying my invention;

FIG. 2 is an enlarged fragmentary top plan view showing the rear wheel and wheel drive assembly;

FIG. 3 is an enlarged fragmentary side elevation view showing the rear wheel and wheel drive assembly;

FIG. 4 is a sectional elevation through the platform of the scooter, taken at line 4—4 of FIG. 3;

FIG. 5 is a fragmentary bottom plan view of the bottom of the scooter platform.

Referring now to the drawing, there is provided scooter A generally including a frame indicated at B and having a front wheel 15 mounted on steering mechanism 16 of conventional design which is manipulated by handle bars 17. Rear or driving wheel 19 is pivotally mounted on two bars 20 forming the rearward extension of frame B. The drive for wheel 19 is accomplished through a sprocket and clutch mechanism generally indicated at C which is driven by a chain 25. Chain 25 in turn is driven by a rocker arm assembly generally indicated at D in which rear end 29 of rocker arm 28 is connected to leading end 30 of the chain, whereby depression of the forward end 31 of the rocker arm will cause the chain to be moved in a forward direction to thereby impart rotary motion to sprocket wheel 32 of sprocket and clutch mechanism C.

The spring return is provided by a spring return and guide mechanism generally indicated at F in which a spring 38 is connected to a rod 39 in which forward end 40 of the rod is connected to trailing end 41 of the chain.

Clutch mechanism C is of conventional design and provides a mechanism whereby the forward motion of the chain will transmit torque to wheel 19 and the reverse movement of the chain in the direction as indicated by arrow 45 will be free wheeling and with a minimum of friction and transmit no torque to the wheel. Thus, propulsion of the vehicle is effected by depressing a pedal 46 pivotally mounted on forward end 31 of rocker arm assembly D which causes the chain to move in the forward direction and impart rotary motion to the clutch mechanism with drive wheel 19. Upon relaxation of pressure on pedal 46 spring 38 will cause the chain to return to its normal position which in turn raises pedal 46 to a position as seen in FIG. 1.

The rocker arm assembly is mounted on a foot rest platform 50 constituting a part of frame B and carrying an axle 51 which forms a pivotal mount supported by a bracket 52 for rocker arm 28. Pedal 46 is provided on its underside with a bracket 58 forming the support for an axle 59 which pivotally mounts the pedal to forward end 31 of rocker arm 28. Spring 60 mounted on bracket 58 and on rocker arm 28 provides a forward bias for pedal 46 at end 31 of the arm which also forms an abutting face 61 which limits the forward movement of the pedal to maintain the pedal in substantially horizontal position when the rocker arm assembly is at normal position as indicated by the solid lines in FIG. 1 and FIG. 3 and still allows the arm to maintain its horizontal positioning upon depression as indicated in the broken lines of FIG. 3.

Rear end of rocker arm 28 is located substantially forward of rear wheel 19. Mounted directly under rear end 29 is an idler sprocket 64 which is carried by two idler sprocket supporting brackets 66. The idler sprocket allows the chain to move in a substantially vertical path from the rocker arm to idler sprocket 65 and thence around the sprocket to driving sprocket 32. Because of this mechanism the entire rocker arm assembly D can be mounted on the main frame assembly and provides a maximum mechanical advantage in chain movement. In prior devices it was necessary to extend the rear end of the rocker arm assembly to a position directly over the driving sprocket. Such a construction would require a great amount of movement of the forward section of the rocker arm in order to obtain the required chain movement or the chain would have to be moved at an angle of minimal mechanical advantage. With the provision of the idler sprocket an optimum amount of chain movement can be effected with a reasonable amount of movement of the pedal assembly.

The guide mechanism F carries its shaft 39 in two brackets 68 and 69 which are mounted on the underside of frame B. The two brackets form axially aligned apertures 70 which form aligned guides for the shaft and allow the shaft to be reciprocally moved therein. Spring 38 is rigidly connected to the frame at 71 via a pin connector and thence passes through an aperture 73 formed in bracket 69 above its aperture 70 and thence is connected by a bolt mechanism 74 to the shaft. Shaft 39 is arranged in coplanar alignment with the two sprockets 32 and 65 and maintains movement of the chain in both planar and vertical alignment with sprocket 32. This mechanism affords the advantage of maintaining chain alignment relative to the sprocket whereby the chain is maintained in position aligned with the sprocket to prevent it from becoming skewed which might otherwise cause it to be either jammed or disengaged.

The invention has been described by specific reference to illustration and example of use but it is understood that variations in construction, design, installation and methods of use may be practiced within the spirit of the invention.

What is claimed is:

1. A wheeled scooter comprising a scooter frame, a front wheel and a rear driving wheel mounted on said scooter frame, a driving sprocket connected to said driving wheel, a chain driving said sprocket, said chain acting reciprocally between first and second positions in actuating said sprocket, a rocker arm mounted on the frame and connected on the chain to pull the chain to the first position, a bar slidably mounted under said frame, aligned with said sprocket and reciprocally movable towards and away from said sprocket, the end of said chain leading to said sprocket being attached to one end of said bar, tension spring means secured to said scooter frame and said bar to cause said chain to be moved to the second position, and a clutch interconnecting said drive sprocket and said drive wheel to transmit torque to said wheel only while said chain is being moved from the second to the first position, an idler sprocket mounted under the rear end of said rocker arm to allow said chain to move substantially vertically upon actuation between said rocker arm and said sprocket.

2. A wheeled scooter vehicle comprising a frame, a wheel mounted on the front of said frame and a driving wheel mounted on the rear of said frame, a driving sprocket connected to said driving wheel, clutch means interconnecting said driving wheel and driving sprocket to allow said sprocket to transmit torque to said wheel in one direction and to be free wheeling in the opposite direction, a driving rocker arm pivotally mounted on the top of said frame upon an axis to allow the rearward end of the arm to move in an arc which is substantially vertical relative to the frame, the rearward end of said arm ending at a position forward of said wheel, an idler sprocket mounted on said frame in coplanar alignment with said driving sprocket and under the rear end of said rocker arm, a driving chain connected to the rear end of said rocker arm, thence downwardly and around said idler sprocket and over and around said driving sprocket and returning to a position under said frame, whereby the portion of the driving chain between the rearward end of the arm and the idler sprocket is moved in a substantially vertical direction relative to the frame, guide means mounted under said frame and connected to the chain to guide the rear end of the chain for movement longitudinally of the scooter frame and resilient means connected to said guide means to urge said chain to pull the rear end of the rocker arm to a downward position, said clutch being arranged to transmit torque to said wheel while the forward end of said rocker arm is being depressed.

3. A wheeled scooter vehicle comprising a frame, a wheel mounted on the front of said frame and a driving wheel mounted on the rear of said frame, a driving sprocket connected to said driving wheel, clutch means interconnecting said driving wheel and driving sprocket to allow said sprocket to transmit torque to said wheel in one direction and to be free wheeling in the opposite direction, a driving rocker arm pivotally mounted on the top of said frame, the rearward end of said arm ending at a position forward of said wheel, an idler sprocket mounted on said frame in coplanar alignment with said driving sprocket and under the rear end of said rocker arm, a driving chain connected to the rear end of said rocker arm, thence downwardly and around said idler sprocket and over and around said driving sprocket and returning to a position under said frame, a bar, means mounting said bar under said frame to guide said bar for longitudinal movement, said chain connected to said bar and spring means connected to said bar and said frame to urge said chain to pull the rear end of the rocker arm in a downward position, said clutch being arranged to transmit torque to said wheel while the forward end of said rocker arm is being depressed.

4. A wheeled scooter comprising a scooter frame, a front wheel and a rear driving wheel mounted on said scooter frame, a driving sprocket connected to said driving wheel, a chain driving said sprocket, said chain acting reciprocally between first and second positions in actuating said sprocket, a rocker arm mounted on the frame and connected on the chain to pull the chain to the first position, a bar slidably mounted under said frame, means supporting said rod for longitudinal movement only relative to said frame, said bar attached to the end of said chain leading to said sprocket, tension spring means secured to said scooter frame and to said bar to urge said bar forwardly and cause said chain to be moved to the second position, and a clutch interconnecting said drive sprocket and said drive wheel to transmit torque to said wheel only while said chain is being moved from the second to the first position.

References Cited by the Examiner
UNITED STATES PATENTS

| 1,237,969 | 8/17 | Stocks | 280—251 |
| 1,536,508 | 5/25 | Lilja | 74—502 |
| 3,075,602 | 1/63 | Lanzone | 74—562.5 X |

FOREIGN PATENTS

| 806,945 | 6/51 | Germany. |
| 1,028,408 | 2/53 | France. |

MILTON BUCHLER, *Primary Examiner.*

KENNETH H. BETTS, A. HARRY LEVY, *Examiners.*